(12) United States Patent
Clark

(10) Patent No.: US 6,899,020 B1
(45) Date of Patent: *May 31, 2005

(54) JERKY OVEN

(75) Inventor: Dean Clark, Riverton, WY (US)

(73) Assignee: Hi Mountain Jerky, Inc., Riverton, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/705,595

(22) Filed: Nov. 10, 2003

Related U.S. Application Data

(63) Continuation of application No. 10/057,398, filed on Jan. 25, 2002, now Pat. No. 6,644,178.

(51) Int. Cl.$^7$ .................................................. A47J 37/04
(52) U.S. Cl. ............................. 99/482; 99/479; 99/427; 99/441; 426/233; 426/314; 426/315
(58) Field of Search ......................... 99/427, 441, 445, 99/448, 467, 477, 479, 481, 482; 426/233, 314, 315

(56) References Cited

U.S. PATENT DOCUMENTS

| | | | | | |
|---|---|---|---|---|---|
| 3,942,425 | A | * | 3/1976 | Canright | 99/467 |
| 4,643,163 | A | * | 2/1987 | Martinez | 126/41 A |
| 4,810,510 | A | * | 3/1989 | Lever et al. | 426/233 |
| 6,024,081 | A | * | 2/2000 | Libertini, Jr. | 126/41 R |
| 6,644,178 | B2 | * | 11/2003 | Clark | 99/482 |

* cited by examiner

Primary Examiner—Reginald L. Alexander
(74) Attorney, Agent, or Firm—Ramon L. Pizarro; Edwin H. Crabtree

(57) ABSTRACT

A smoker oven that includes a housing having an internal cavity having a top portion, a mid-portion, and a lower portion. The internal cavity houses a support frame that has at least one generally horizontal support surface for supporting and rotating a jerky rack. The jerky rack holds food items in sheet form, such as strips of jerky, at an angle to the horizontal support surface, so that upon rotation of the jerky rack the food items in sheet form cause an agitation and motion of the air within the cavity to produce even heating of the food items and cause fluids released by the food item to flow off of the food item.

13 Claims, 4 Drawing Sheets

JERKY OVEN

REFERENCE TO RELATED APPLICATIONS

This application is a continuation of my utility application having Ser. No. 10/057,398, filed Jan. 25, 2002, now U.S. Pat. No. 6,644,178, incorporated herein by reference in its entirety.

BACKGROUND OF THE INVENTION (a) Field of the Invention

This invention generally relates to a cooker or oven that is particularly useful for processing meats to produce smoked meats. More particularly, but not by way of limitation, to a smoker oven that releases innocuous amounts of smoke from the meat preparation process.

(b) Discussion of Known Art

The pleasing flavor of the smoke from certain woods has long been appreciated and sought after in the processing of meats. Still further, many baked cooked products are particularly rich in flavor at the moment that the cooking or baking process is completed. At this point the flavors imparted by the cooking or baking process and the natural flavors and juices imparted by the meat and spices are at an optimum state for consumption. After the cooking process has been completed, the taste of the meat begins to deteriorate due to the effects of other living organisms and the effects of chemicals that make up the air around the meat.

In order to savor the finished cooked or baked product, the consumer has to have access to the product as it is being produced. However, this has been rather impractical for products such as smoked meats. Known meat smokers produce large amounts of smoke, which means that these smokers must be used outside in well-ventilated areas. The fact that these smokers must be used outside makes these smokers impractical for use at the point-of-sale. Thus, there remains a need for a device that can be used as a point-of-sale cooking device that can produce smoked meats, such as jerky.

An example of a known device that can be used as a cooker at the point of sale is found in U.S. Pat. No. 6,167,797 to Bollich. The Bollich device includes a pair of compartments. One compartment is used for creating smoke, and the other compartment is used for holding the meats that are to be processed and exposed to the smoke created in the other compartment. The Bollich device presents a stand-alone system for preparing smoked meats, but suffers from the limitation that the system must be vented to the atmosphere due to the direct release of smoke used in cooking.

A review of other known devices reveals that there remains a need for a smoker, cooker that can be used in enclosed areas, such as convenience stores. There remains a need for a smoker that can be used indoors and does not require the ventilation a duct leading to the outdoors or the use of a hood, as may be found in many restaurants.

Still further, there remains a need for a slow cooker oven that can be vented directly into an enclosed structure such as a convenience store, and thus allow the use of the device at a retail establishment such as a retail store. To aid in the selling of the products manufactured with the use of the slow cooker, it is desired to provide a cooking system that vent the aroma of the cooking meats onto the sales area, and thus trigger the appetite of passers by.

There remains a need for an oven that can be used in enclosed areas and which can efficiently circulate the air and smoke within the oven to produce uniform flavoring and uniform heating of the meat being cooked within the oven.

SUMMARY

It has been discovered that the problems left unanswered by known art can be solved by providing an oven that includes:

a housing having an internal cavity;

a support frame that supports a jerky rack, the support frame being suspended from the top portion of the housing; and a heater located below the support frame.

According to one example of the invention a smoke source is positioned immediately over the heater, in the lower portion of the internal cavity. This will allow an amount of smoke released in the lower portion to rise to the support frame to expose any jerky on the jerky rack to the smoke.

Additionally, it is contemplated that a low volume of flow of air will be created by providing apertures on opposite ends of the oven. A fan will be positioned near one of the apertures, and will be used to pull air from the oven through a filter and then out into the area where the oven is being used. The size of the apertures, and hence the flow rate through the oven, may be controlled by providing a mechanism to adjust the size of the apertures or the number of apertures that are used to allow air into or out of the oven. The control of the airflow through the oven can be used to control the moisture of the cooked jerky or other food products cooked in the oven.

Still further, it is contemplated that a set of removable support racks will be used to support the food items being processed. The support racks will support the food items at an angle that is less than ninety degrees to the horizontal. This angled orientation will allow rotation of the food items along a plane that is parallel to the horizontal, and thus use the shape or surfaces of the food items to create or bolster the flow or circulation of air or air and smoke within the oven. The angled support may be achieved by providing angled support surfaces on the racks themselves or by positioning food supports on the racks in order to achieve the angled orientation.

It is further contemplated that the food support racks will hold the food at an angle, the longer dimension of the food items extending horizontally along the plane of the rack. In other words, an elongated, rectangular piece of meat being processed into jerky will be positioned with its long axis parallel to the horizon and the shorter ends at an angle to the horizon to create that fan blade effect. It has been discovered that this arrangement not only produces a fan effect, but also allows grease to flow off of the meat without concentrating on an end of the meat. Still further, it has been discovered that the movement of the frame with the support rack greatly reduces hot-spots and over-exposed flavored areas, especially when using food products to create a fan-blade effect. This results in evenly cooked, evenly flavored finished product.

Still further, it has been discovered that by leaning the food items at an angle, especially when the food items are in sheet form, the processing eliminates the accumulation of moisture or fluidized fat on sections of the meat. The angled support allows these fluids to run off the food being processed. This is distinguishable from known devices that hold strips in a vertical, straight up and down manner, with encourage accumulation of run-off fluids and seasonings at the lower ends of the meat or other food products being processed.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
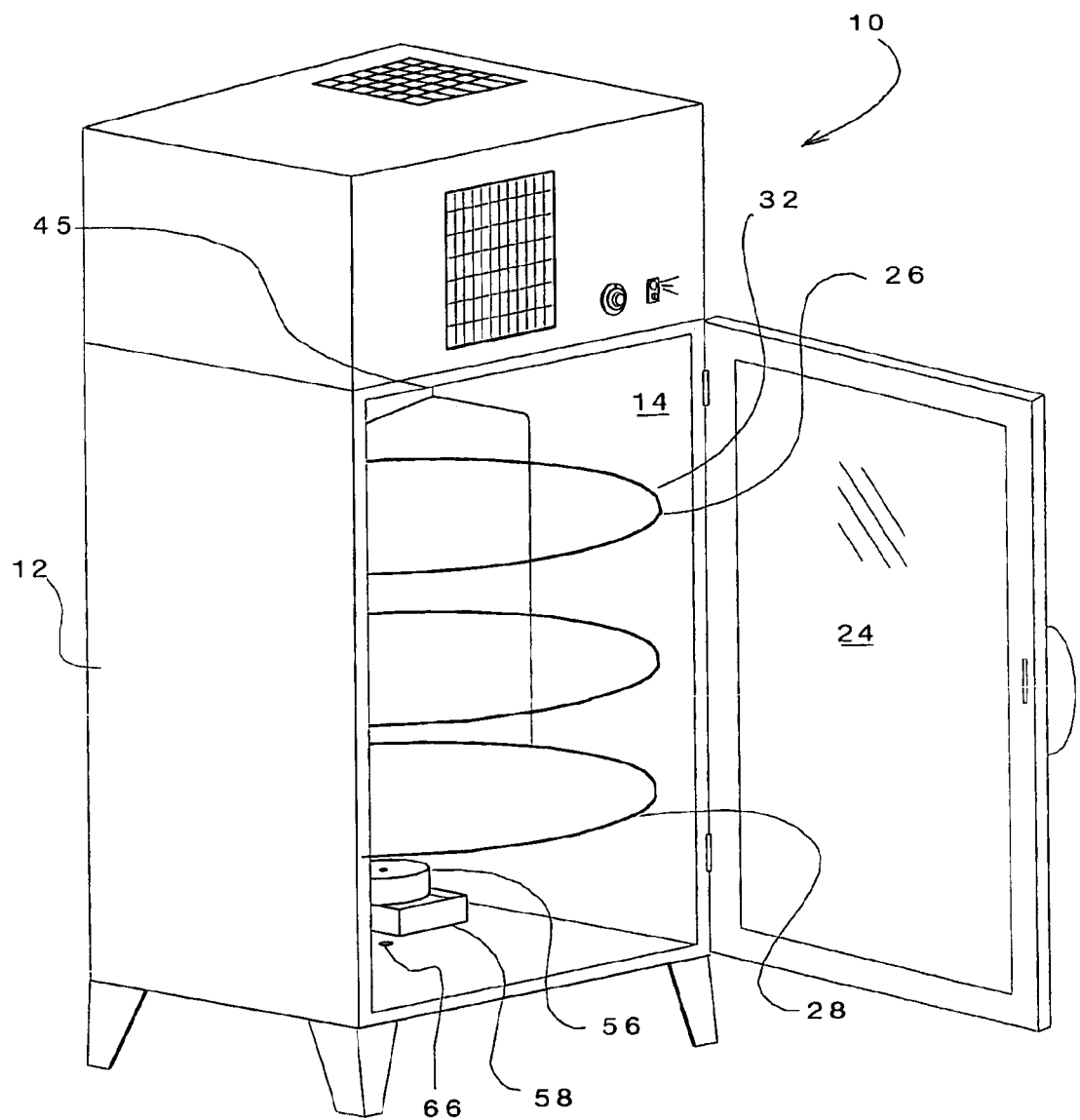
FIG. 1 is a perspective view of an embodiment of the invention.

Turning now to FIG. 1 where an example of a smoker oven 10 made in accordance with the principles taught herein has been illustrated. The oven 10 includes a housing 12 that has an internal cavity 14, with a top portion 16, a mid-portion 18, and a lower portion 20. It is contemplated that one of the panels 22 may be made of a transparent material, such as a tempered glass. In the illustrated example, the access door 24 is made of a tempered glass that allows passers by to see the food products being cooked or prepared.

Figure 2:
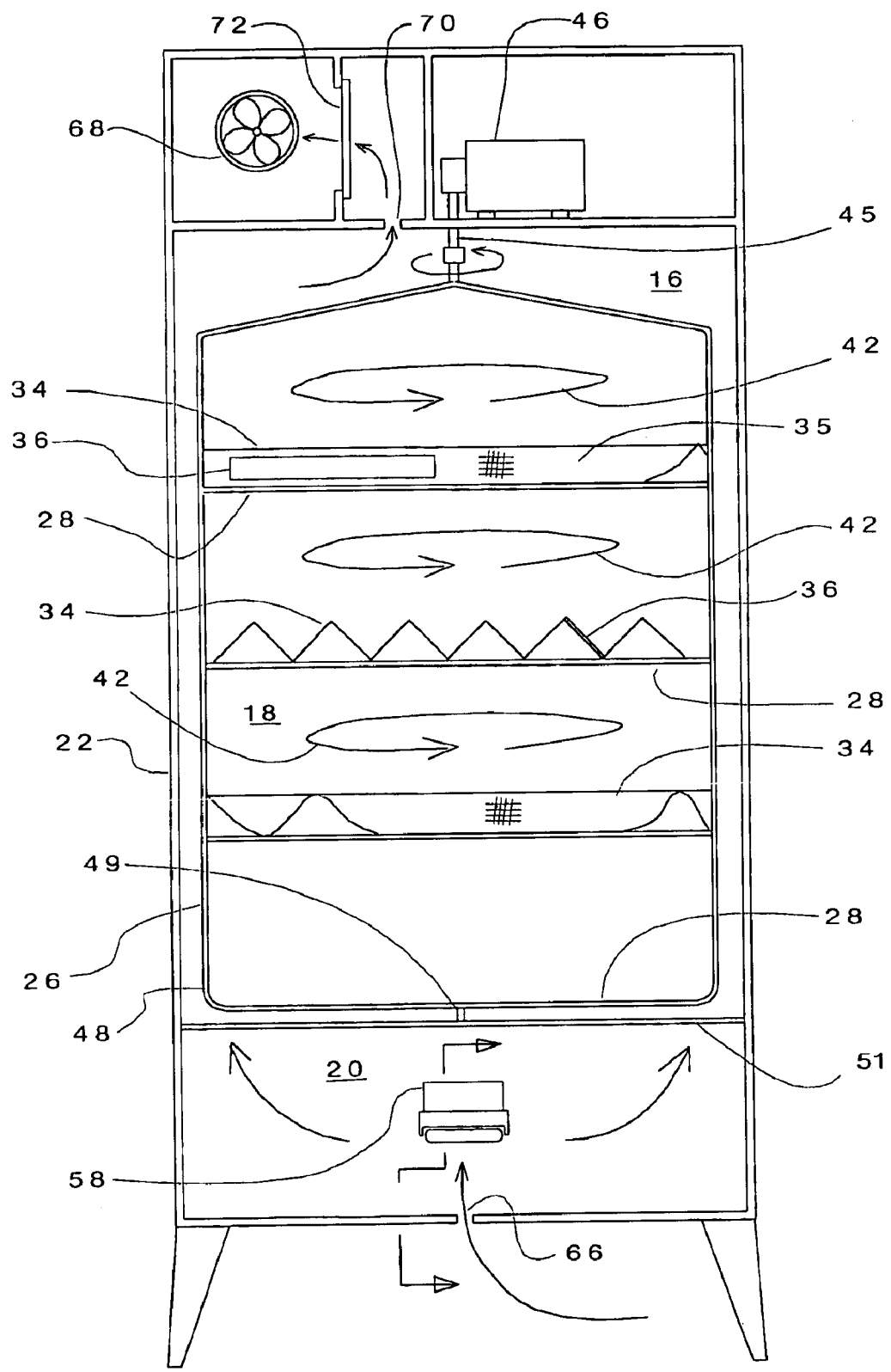
FIG. 2 is an elevational view of the internal cavity of the oven. The door of the oven, which may be made of a transparent material, has not been shown.

Illustrated in FIGS. 1 and 2 is that it is contemplated that the oven 10 will include a support frame 26 that includes at least one generally horizontal support surface 28 for supporting a jerky support rack 34. In the illustrated example, the horizontal support surface 28 is defined by a loop 32 that lies along a plane. It is important to note, however, that it is contemplated that the horizontal support surface 28 may be defined by three support points, or any other manner of defining a plane or planar surface supported from the support frame 26. The support surface may be used to directly support food items to be processed or to support the support rack 34 that is used to support food items being processed. Thus, the support rack 34 should include a planar support surface 35 or points on a plane that cooperate with the horizontal support surface 28 of the support frame 26.

As illustrated in FIGS. 2, 4, 5 and 6, the support rack 34 will support the food items 36 being processed at an angle to the horizontal support surface 28. The angled position may be achieved by simply providing a vertical support 38 and a horizontal support 40 on the support rack 34, as shown on FIG. 6. It is also contemplated that the support rack 34 will allow air to flow around the food items 36 being processed. Importantly, it is contemplated that the use of rectangular sheets or sections of food items 36 would provide the benefit of creating a fan-blade type of effect from the food items 36. In other words, it is contemplated that the support frame 26 will be rotated in the direction of arrows 42. This rotation will cause the food items 36 to move the air around them in the direction of arrows 44, and thus create an internal flow or current of air that will aid in the cooking or processing of the food items 36, which in one example are rectangular sections of meat in sheet form that is being processed into jerky.

Figure 4:
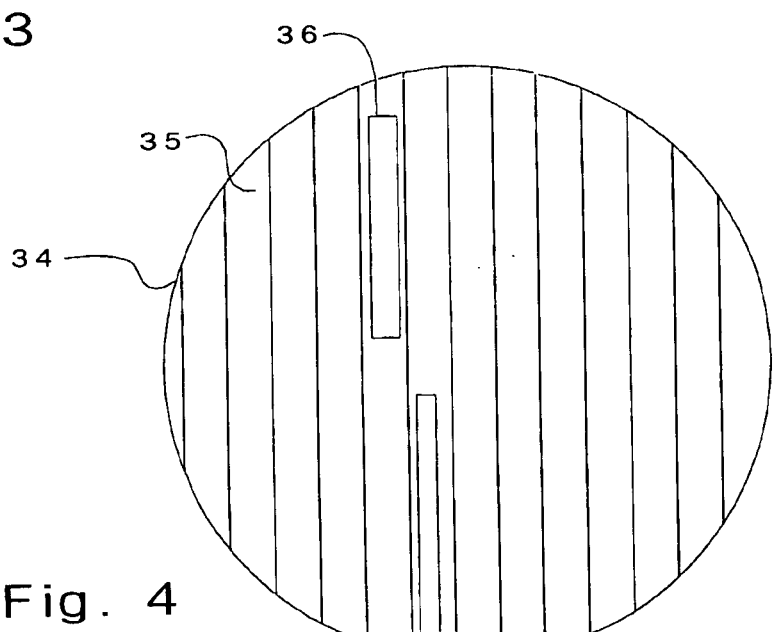
FIG. 4 is a top, plan view of a support rack used with the disclosed invention.
Figure 5:
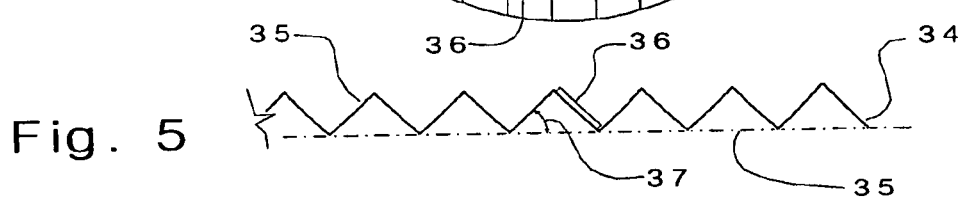
FIG. 5 is a side view of one of the support racks used with the disclosed invention.
Figure 6:
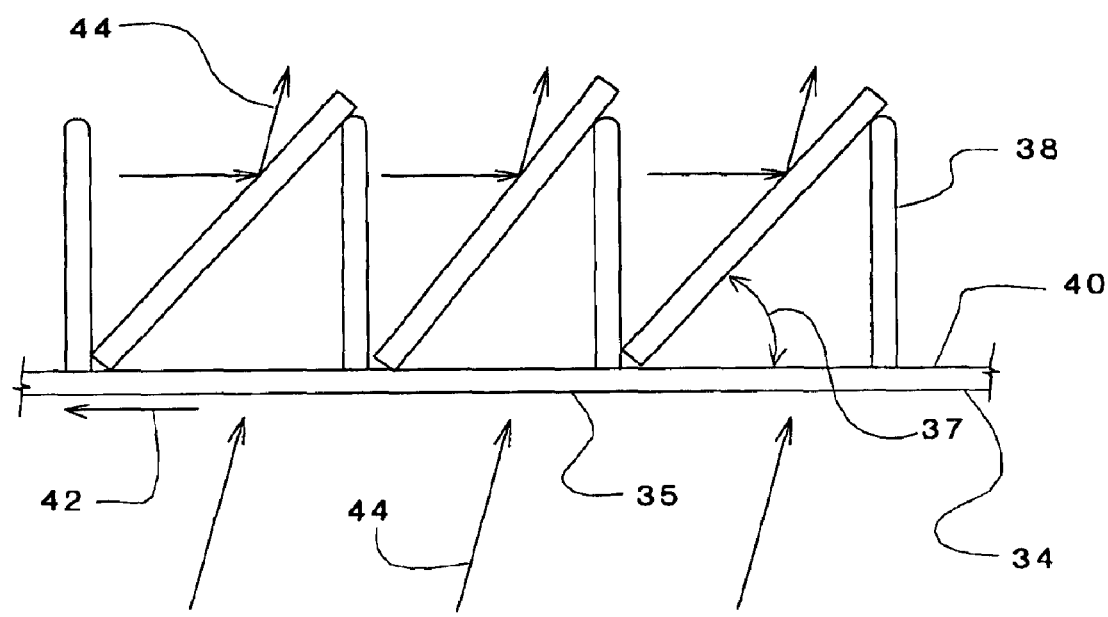
FIG. 6 is a side view of an example of a racks used to support jerky. The view also shows the fan effect discussed herein.

The meat may be placed on the support rack 34 in a frozen state or as a section of thawed meat. In the event that thawed meat is used, it is contemplated that the support rack 34 will incorporate a configuration as shown in FIGS. 2, 4 and 5, in which the support racks 34 are made of a wire mesh corrugated in an zig-zag, or sinusoidal, pattern. The surfaces of the support racks 34 provide the angled surfaces 35 that support the meat strips at an angle 37 to the horizontal support surface 40 and create the fan-blade effect while rotating the frame 26. It is important to note that while it is contemplated that the disclosed invention can take advantage of this fan-blade effect, it is contemplated that the disclosed invention can be used to process food products that are not in sheet form. Examples of these products include sausages, and other products that may not be in sheet form.

In order to rotate the frame 26, together with support racks 34, it is contemplated that the frame 26 will be suspended from the top portion 16 and rotated by way of a shaft 45 and a motor 46. The lower end 48 of the frame will preferably be supported on a short shaft 49 or other bearing or retainer mechanism 51.

Figure 3:
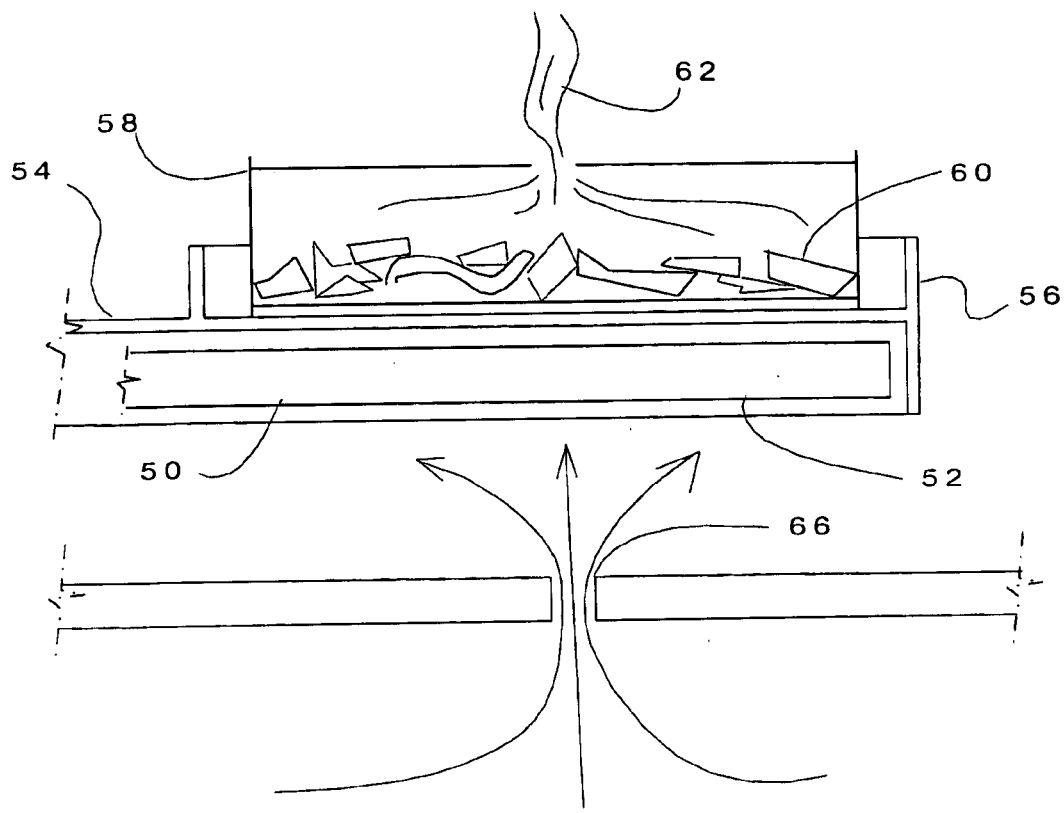
FIG. 3 is a sectional view taken from FIG. 2, and illustrates the mounting of a can containing sawdust over a heating element and over an outside air source at the lower portion of the oven.

Additionally, the lower end 48 of the support frame 26 will be positioned over a heater 50 that will be used for providing heat to the lower portion 20 of the internal cavity 14. The heater 50 has been illustrated in greater detail in FIG. 3, which shows a resistance heating element 52, or other heat transmission device, mounted below a shield 54 and support 56. The shield 54 protects the heating element 52 from drippings that may fall from the food items being processed. Additionally, the support 56 has been illustrated as being incorporated directly on the shield 54. The support 56 serves as a support for a can 58 of a desired wood sawdust 60 that is burned within the can to produce a flavoring smoke 62. The burning of the sawdust 60 is produced by the heat generated from the heating element 52, directly below the can 58.

In operation, smoke 62 from the burning sawdust 60 leaves the can 58 through an aperture 64 in the can 58. This smoke 62 rises up towards the support frame 26 due to the elevated temperature of the smoke 62, due to the internal air current created by the fan effect created from the turning of the meat on the support rack 34, and due to a small flow created by the drawing of air through a floor aperture 66 in the lower portion 20 of the housing 12. The vacuum needed for drawing air though the floor aperture 66 is created by an exhaust fan 68 that is uses to pull air out of the housing 12 through a ceiling aperture 70 in the top portion 16. The air drawn the ceiling aperture 70 is filtered through a filter 72 before being released from the oven 10.

The semi-closed arrangement of the internal cavity 14, with the small floor aperture 66 and the small ceiling aperture 70, provides a long residence time for smoke and heat being used to process the food items. This long residence time, combined with the thorough mixing and contact of the air and smoke mixture within the internal cavity 14 results in thorough cooking and flavoring of the food items without the need to inject large amounts of heat and smoke, as required by previously known devices. Furthermore, the low flow-through of air and smoke mixture minimizes the drying or loss or moisture of the food being processed, which results in a moist, thoroughly cooked, flavorful product.

Additionally, due to the low volume of smoke needed with the disclosed system, the effective removal of the smoke by the filter 72 can be accomplished with fairly unsophisticated filtering systems. The filtered air, with the smoke removed, can then be released directly into the room housing the oven 10, without the need for a duct that releases the air to outdoors. Thus, it will be understood that the disclosed system can be used indoors without the need for special ventilation systems for filtering smoke drawn from the internal cavity 14 is e filter being in fluid communication with the top portion of the internal cavity, so that an amount of smoke released in the lower portion is allowed to rise to the support frame to expose the support surface of the support frame to the amount of smoke as the filter is used to remove the smoke form the top portion.

Additionally, the release of the filtered air from the internal cavity 14 into the room or area where the oven 10 is situated will allow passers by to smell the appetizing scent of the food being processed, aiding in the sale of the food being processed.

Still further, it will be understood that it is contemplated that the support frame 26 is removably suspended from the top portion. The removal of the support frame 26 from the drive shaft 44 will allow the entire frame 26 and support racks 34 to be removed from the internal cavity 14 for cleaning. Additionally, the shield 54 and support 56, together with the heating element 52 will be removable to allow cleaning of the entire internal cavity 14.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A smoker oven comprising:
   a housing having an internal cavity having a top portion, a mid-portion, and a lower portion;
   a support frame having at least one generally horizontal support surface adapted for supporting a support rack, the support frame being supported in a manner that allows rotation of the support frame in the housing;
   a frame motor mounted over the top portion of the housing, the frame motor being connected to the support frame to rotate the support frame;
   a heater for providing heat to the lower portion; and
   a support rack having a planar support surface and a plurality of angled support surfaces, the angled support surfaces being adapted for supporting the food product in sheet form at an angle to the horizontal support surface, so that on rotation of the horizontal support surface with the support rack, the food product causes agitation and distribution of an amount of air in the internal cavity and distribute heat from the heater to minimize hot spots within the internal cavity while preventing accumulation of fluids from the food products.

2. A smoker oven according to claim 1 wherein the angle support surface is generally sinusoidal.

3. A smoker oven according to claim 1 and further comprising a smoke source, the smoke source being positioned within the lower portion of the housing.

4. A smoker oven according to claim 1 and further comprising an exhaust fan, the exhaust fan being positioned over the top portion of the housing and drawing air from the internal cavity of the smoker oven.

5. A smoker oven according to claim 1 and further comprising a smoke source that is positioned immediately above the heater.

6. A smoker oven for processing a food product in sheet form, the smoker oven using air to transmit heat to the food product, the smoker oven comprising:
   a housing having an internal cavity having a top portion, a mid-portion, and a lower portion;
   a support frame, the support frame being rotatably supported within the internal cavity and having at least one generally horizontal support surface;
   a frame motor mounted over the top portion of the housing, the frame motor being connected to the support frame to rotate the support frame;
   a heater for providing heat to the lower portion;
   a support rack having a planar support surface and a plurality of angle support surfaces, the angle support surfaces being adapted for supporting the food product in sheet form at an angle to the planar surface, so that upon rotation of the support frame the support rack rotates the food product causes agitation and distribution of an amount of air in the internal cavity and distribute heat from the heater to minimize hot spots within the internal cavity while preventing accumulation of fluids from the food products.

7. A smoker oven according to claim 6 wherein said support frame is removably suspended from the top portion.

8. A smoker oven according to claim 6 and further comprising a smoke source supported within the housing.

9. A smoker oven according to claim 6 and further comprising a smoke source, the smoke source being positioned above the heater and below the support frame.

10. A method for processing a food product in sheet form, the method comprising:
    providing a smoker oven comprising:
    a housing having an internal cavity having a top portion, a mid-portion, and a lower portion;
    a support frame, the support frame being rotatably supported within said internal cavity and having at least one generally horizontal support surface;
    a frame motor mounted over the top portion of the housing, the frame motor being connected to the support frame to rotate the support frame;

a support rack having a planar support surface and a plurality of angle support surfaces, the angle support surfaces being adapted for supporting the food product in sheet form at an angle to the planar surface; an a heater for providing heat to the lower portion;

placing the food product in sheet form on the support rack at an angle to the planar surface;

heating an amount of air the lower portion with the use of the heater;

rotating the support frame to move the food product in sheet form at an angle to the direction of rotation, so that upon rotation of the support frame the support rack rotates the food product causes agitation and distribution of an amount of air in the internal cavity and distribute heat from the heater to minimize hot spots within the internal cavity while preventing accumulation of fluids from the food products.

11. A method according to claim 10 and further comprising placing a smoke source over the heater, so that a convection current created below the smoke source to at least partially carry an amount of smoke from the smoke source up towards the support rack.

12. A method according to claim 11 and further comprising urging the amount of smoke from the smoke source to by rotating the support frame to cause the food product in sheet form to push the air and amount of smoke in the internal cavity to flow upwards.

13. A method according to claim 12 and further comprising creating a flow of air and smoke by pushing the amount of smoke and air by rotating the food product in sheet form at an angle to a direction of movement of the food product in sheet form.

* * * * *